(12) United States Patent
Ye et al.

(10) Patent No.: US 12,501,048 B2
(45) Date of Patent: Dec. 16, 2025

(54) MODEL PARAMETER DERIVATION FOR PREDICTION MODES BASED ON LEAST MEAN SQUARE OPTIMIZATION

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Madhu Peringassery Krishnan, Palo Alto, CA (US); Yushin Cho, Palo Alto, CA (US); Tianqi Liu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/803,240

(22) Filed: Aug. 13, 2024

(65) Prior Publication Data
US 2025/0254314 A1 Aug. 7, 2025

Related U.S. Application Data

(60) Provisional application No. 63/549,369, filed on Feb. 2, 2024.

(51) Int. Cl.
*H04N 7/12* (2006.01)
*H04N 19/105* (2014.01)
*H04N 19/132* (2014.01)
*H04N 19/176* (2014.01)
*H04N 19/186* (2014.01)
*H04N 19/46* (2014.01)

(52) U.S. Cl.
CPC ......... *H04N 19/132* (2014.11); *H04N 19/105* (2014.11); *H04N 19/176* (2014.11); *H04N 19/186* (2014.11); *H04N 19/46* (2014.11)

(58) Field of Classification Search
CPC .................................................. H04N 19/132
See application file for complete search history.

(56) References Cited

PUBLICATIONS

Luc N. Trudeau et al., "Predicting Chroma from Luma in AV1", IEEE, 2018 Data Compression Conference, Mar. 2018, 9 pgs.

(Continued)

*Primary Examiner* — Y Lee
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and signals a syntax element for a cross-component prediction (CCP) mode. When the CCP mode is enabled, a computing system identifies a reference area of the current coding block and downsamples the reference area to identify samples of a subset of reference area. A plurality of model parameters used in the CCP mode are determined for a first chroma sample of the current coding block based on the samples of the subset of reference area. The computing system combines a set of one or more luma samples (e.g., of a reference coding block) using the plurality of model parameters to generate the first chroma sample. The image frame is reconstructed based on the current coding block including the first chroma sample.

25 Claims, 10 Drawing Sheets

(56) References Cited

PUBLICATIONS

Peter de Rivas et al., "AV1 Bitstream & Decoding Process Specification", Version 1.0.0 with Errata 1, Alliance for Open Media, Codec Working Group, Jan. 2018, 681 pgs., Retrieved from the Internet: https://aomediacodec.github.io/av1-spec/av1-spec.pdf.

Yue Chen et al., "An Overview of Core Coding Tools in the AV1 Video Codec", 2018 IEEE Picture Coding Symposium (PCS), Jun. 2018, 5 pgs.

MODEL PARAMETER DERIVATION FOR PREDICTION MODES BASED ON LEAST MEAN SQUARE OPTIMIZATION

RELATED APPLICATIONS

This application claims priority to U.S. Provisional Patent Application No. 63/549,369, entitled "Model Parameter Derivation for Prediction Modes Based on Least Mean Square Optimization," filed Feb. 2, 2024, which is hereby incorporated by reference in its entirety.

TECHNICAL FIELD

The disclosed embodiments relate generally to video coding, including but not limited to systems and methods for processing video data using cross-component prediction.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes cross component intra or inter prediction of video data in a cross component prediction (CCP) mode where each of a plurality of samples of a second color component of a current coding block is determined based on one or more associated samples of a first color component of a reference coding block (e.g., the current coding block itself). The CCP mode corresponds to a multi-tap model that includes a number (N) of taps. Each tap is selected from a sample of the first color component, the one or more associated neighboring samples of the first color component, a nonlinear term, and an offset term. The selected taps are combined using a plurality of model parameters to determine the sample of the second color component. In some embodiments, the sample of the first color component is a luma sample, and the sample of the second color component is a chroma sample. The chroma sample is a weighted combination of terms selected from a respective luma sample, one or more neighboring luma sample, a nonlinear term, and the offset term. In some embodiments, when the CCP mode is enabled for a current coding block, samples of a respective reference area are applied to determine the model parameters. The samples of the respective reference area may be downsampled, thereby reducing the amount of computation and storage resources required to determine the plurality of model parameters.

In some embodiments, when samples of a first color components are applied to determine samples of a second color component, each sample of the first color component is a luma sample, and each sample of the second color component is a blue-difference chroma (Cb) sample or a red-difference chroma (Cr) component. Alternatively, in some embodiments, the first color component is one of the red, green, and blue colors, and the second color component is another one of the red, green, and blue colors. Alternatively, in some embodiments, the first color component and the second component correspond to a color format that is distinct from a YCbCr color format and an RGB color format.

In accordance with some embodiments, a method of video decoding is provided. The method includes receiving a video bitstream including a current coding block of a current image frame. The video bitstream includes a syntax element for a CCP mode. The method further includes, based on the syntax element, determining that the CCP mode is enabled to reconstruct a first chroma sample of the current coding block based on a set of one or more luma samples (e.g., of a reference coding block); identifying a reference area of at least the current coding block; downsampling the reference area to identify samples of a subset of reference area; determining a plurality of model parameters used in the CCP mode for the first chroma sample of the current coding block based on the samples of the subset of reference area; combining the set of one or more luma samples using the plurality of model parameters to generate the first chroma sample of the current coding block; and reconstructing the current image frame including the first chroma sample of the current coding block.

In accordance with some embodiments, a method of video encoding is provided. The method includes receiving video data comprising a current coding block of a current image frame; encoding the current image frame; transmitting the encoded current image frame via a video bitstream; and signaling, via the video bitstream, a syntax element for a CCP mode indicating whether to reconstruct a first chroma sample of the current coding block based on a set of one or more luma samples. When the CCP mode is enabled, a reference area of at least the current coding block is downsampled and applied to determine a plurality of model parameters used in the CCP mode.

In accordance with some embodiments, a method of bitstream conversion is provided. The method includes obtaining a source video sequence including a current image frame having a current coding block; and performing a conversion between the source video sequence and a video bitstream. The video bitstream includes the current image frame having the current coding block and a syntax element for a CCP mode indicating whether to reconstruct a first chroma sample of the current coding block based on a set of one or more luma samples. When the CCP mode is enabled, a reference area of at least the current coding block is downsampled and applied to determine a plurality of model parameters used in the CCP mode.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes video compression methods using intra prediction and inter prediction. Samples of a current coding block may be reconstructed from samples of a reference coding block based on a model having a plurality of model parameters. For example, the model is used to predict a chroma sample of the current coding block as a linear or nonlinear weighted sum of multiple inputs of luma samples of the reference coding block, which may be the same as the current coding block. A reference area associated with the current coding block and/or an associated reference coding block includes a plurality of reconstructed neighboring samples (e.g., luma and chroma samples), which are used to determine the plurality of model parameters of the model used to reconstruct the samples of the current coding block. For example, the model parameters may be determined by feeding neighboring reconstructed samples (e.g., in the reference area) of the current coding block and the reference coding block into a least mean square calculation kernel. In some implementations of this application, the reconstructed neighboring samples of the reference area can be downsampled to reduce the amount of computation and storage resources required to determine the plurality of model parameters and expedite model parameter determination.

Figure 1:
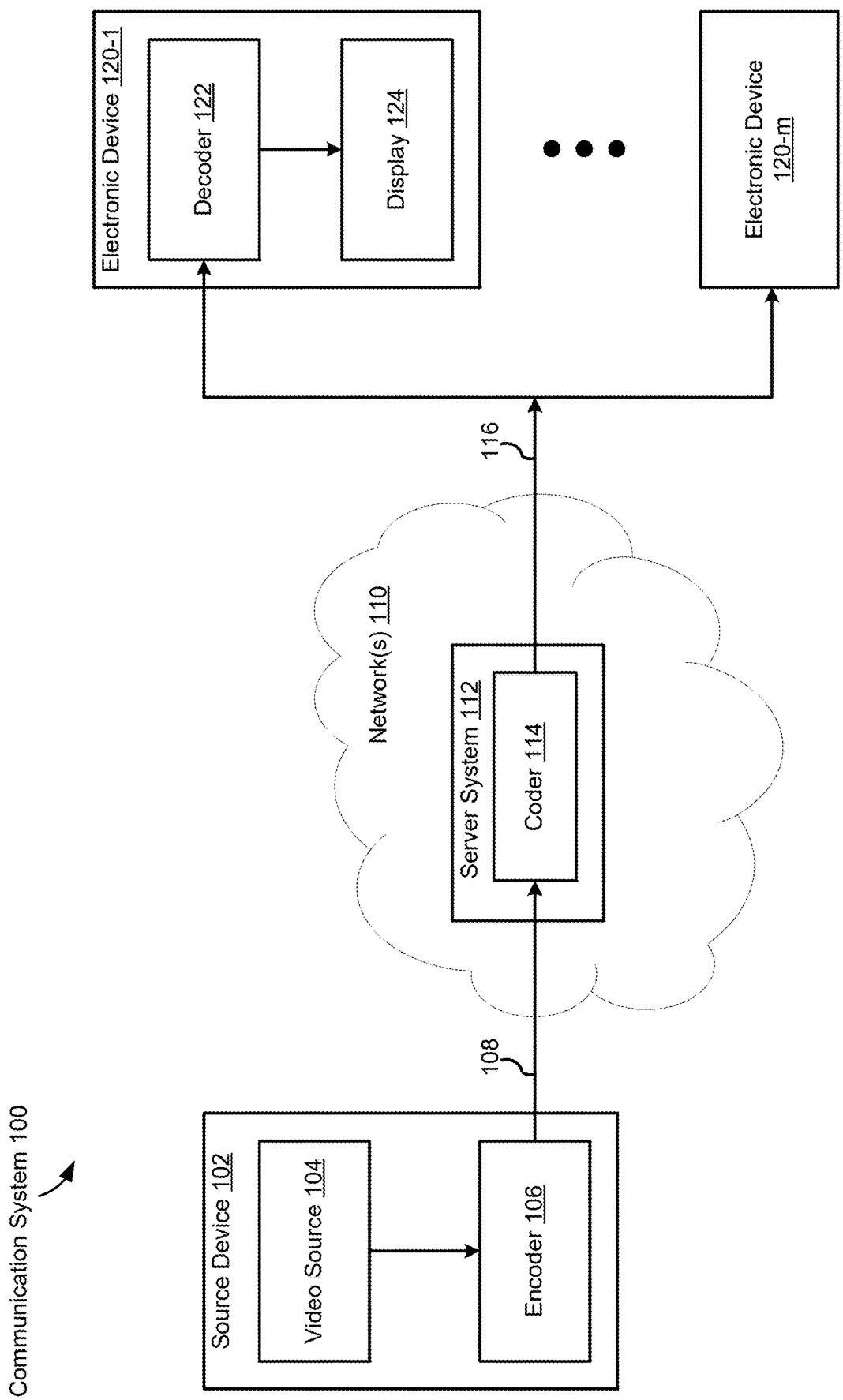
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
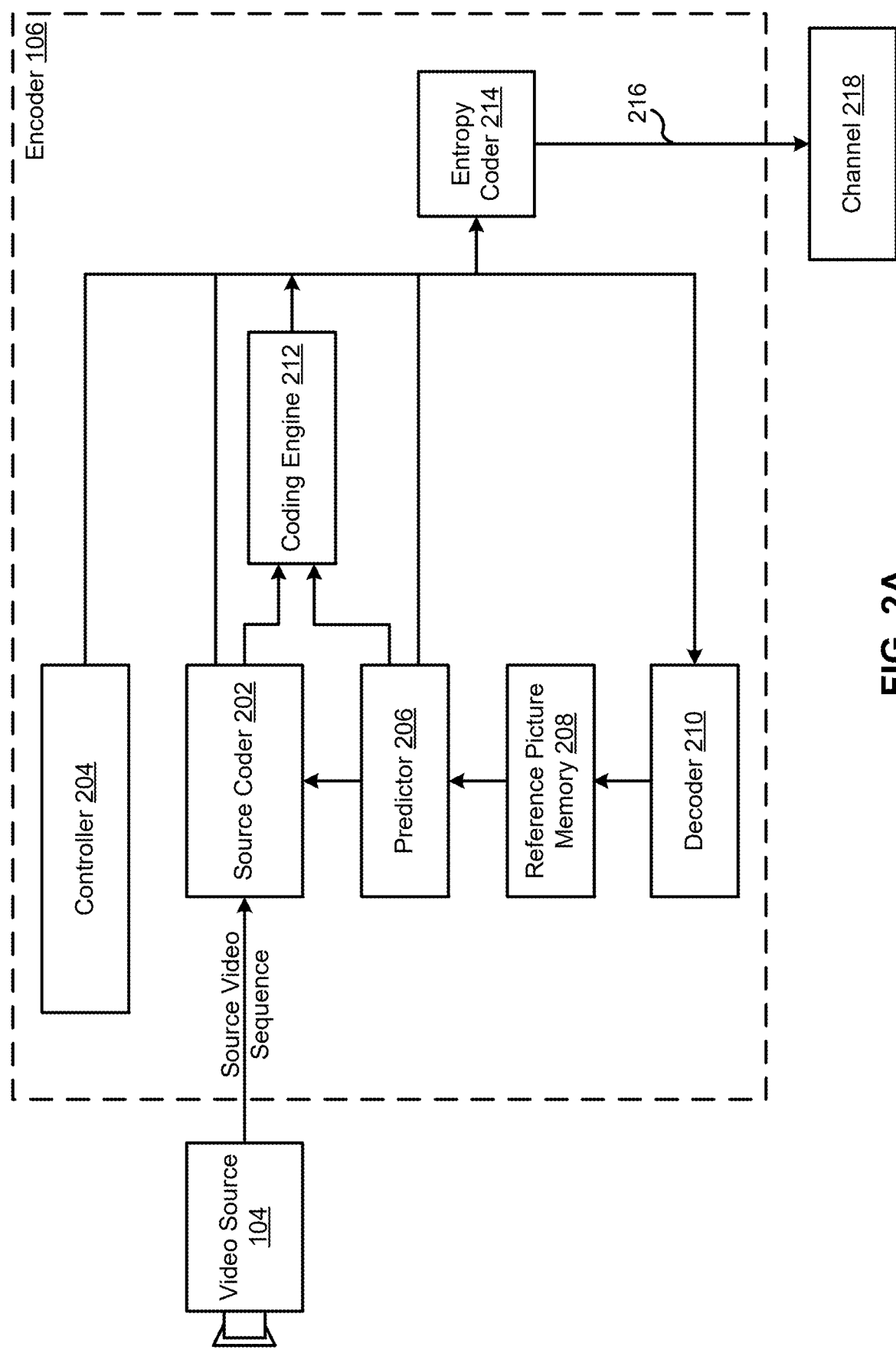
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
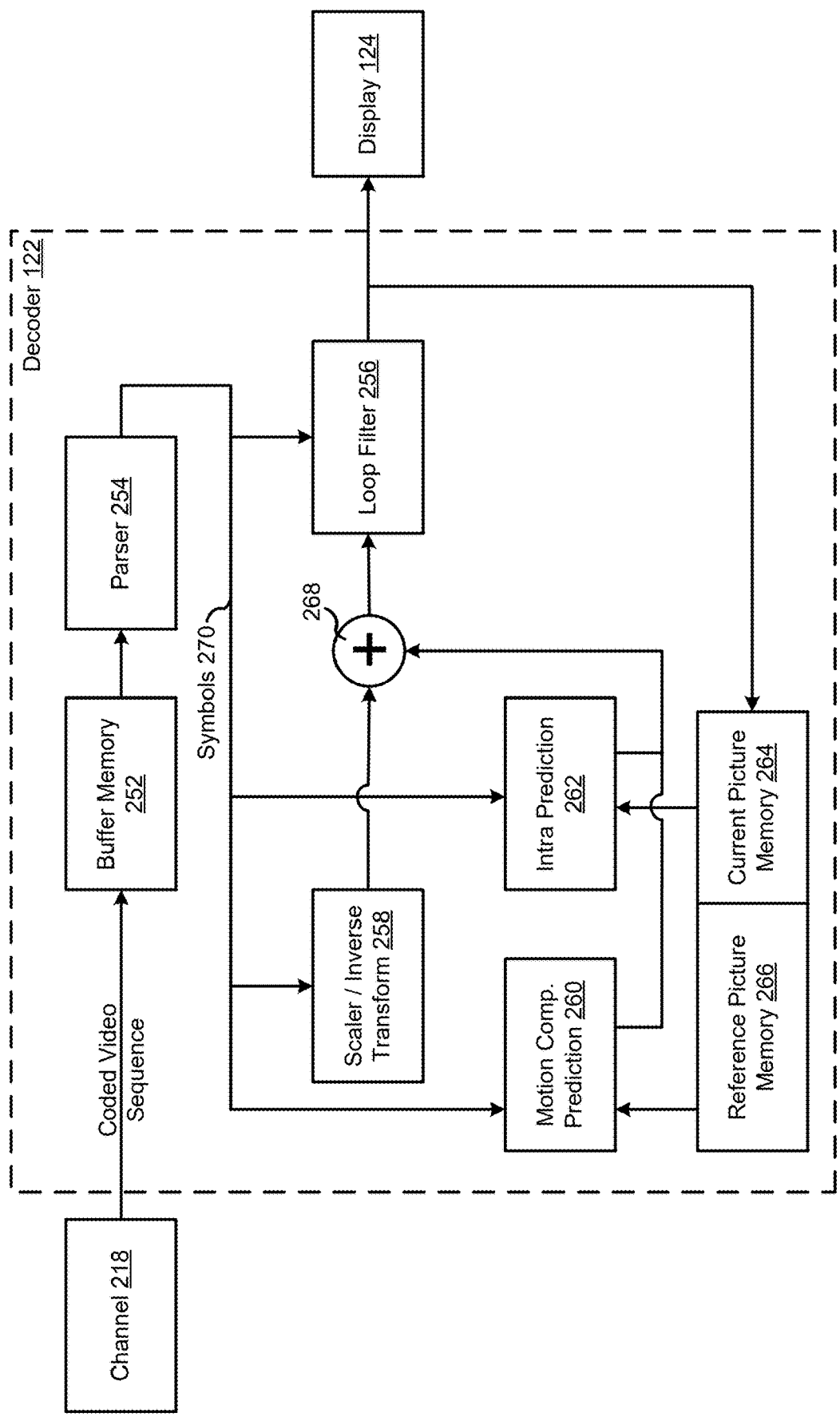
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
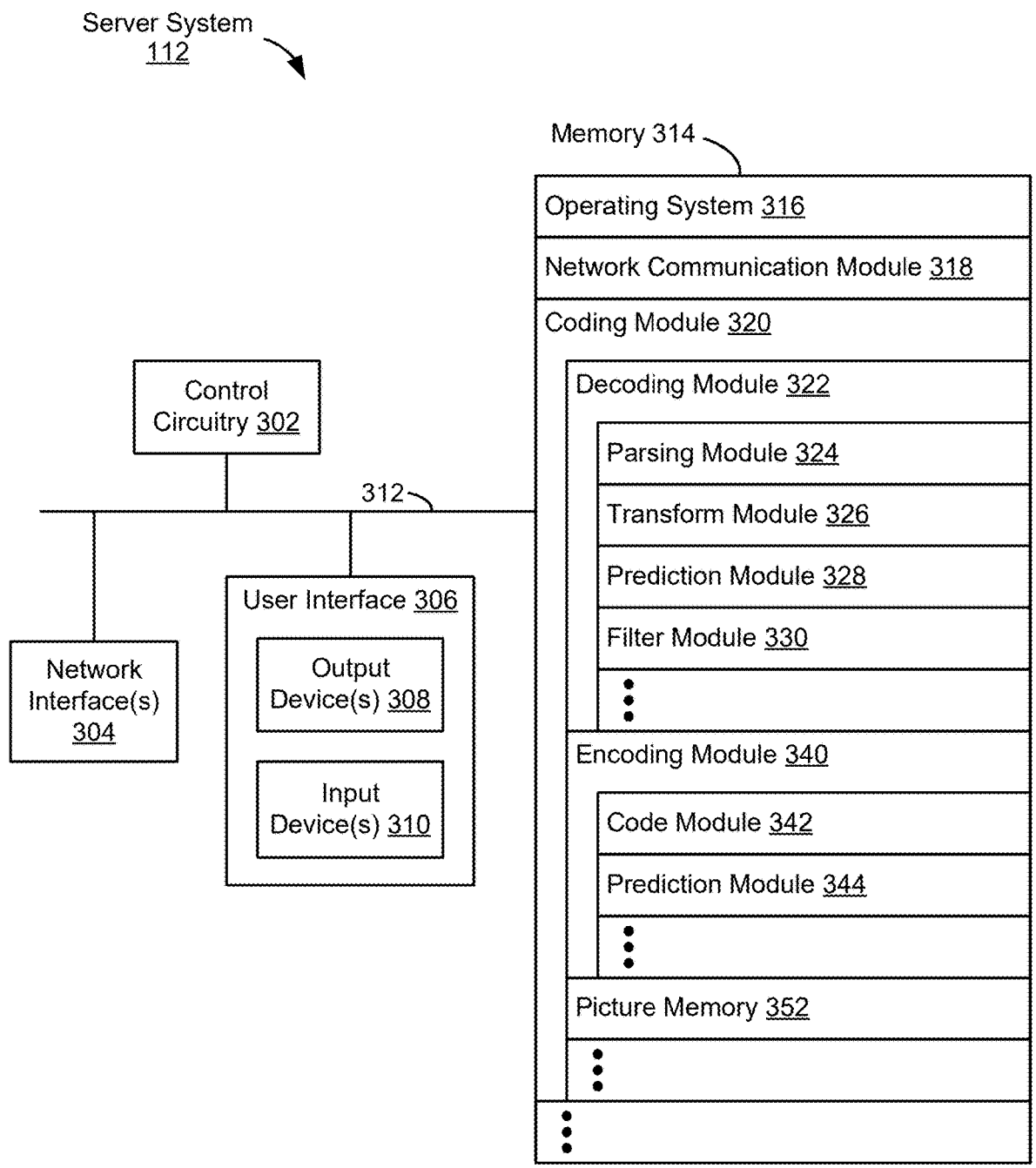
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
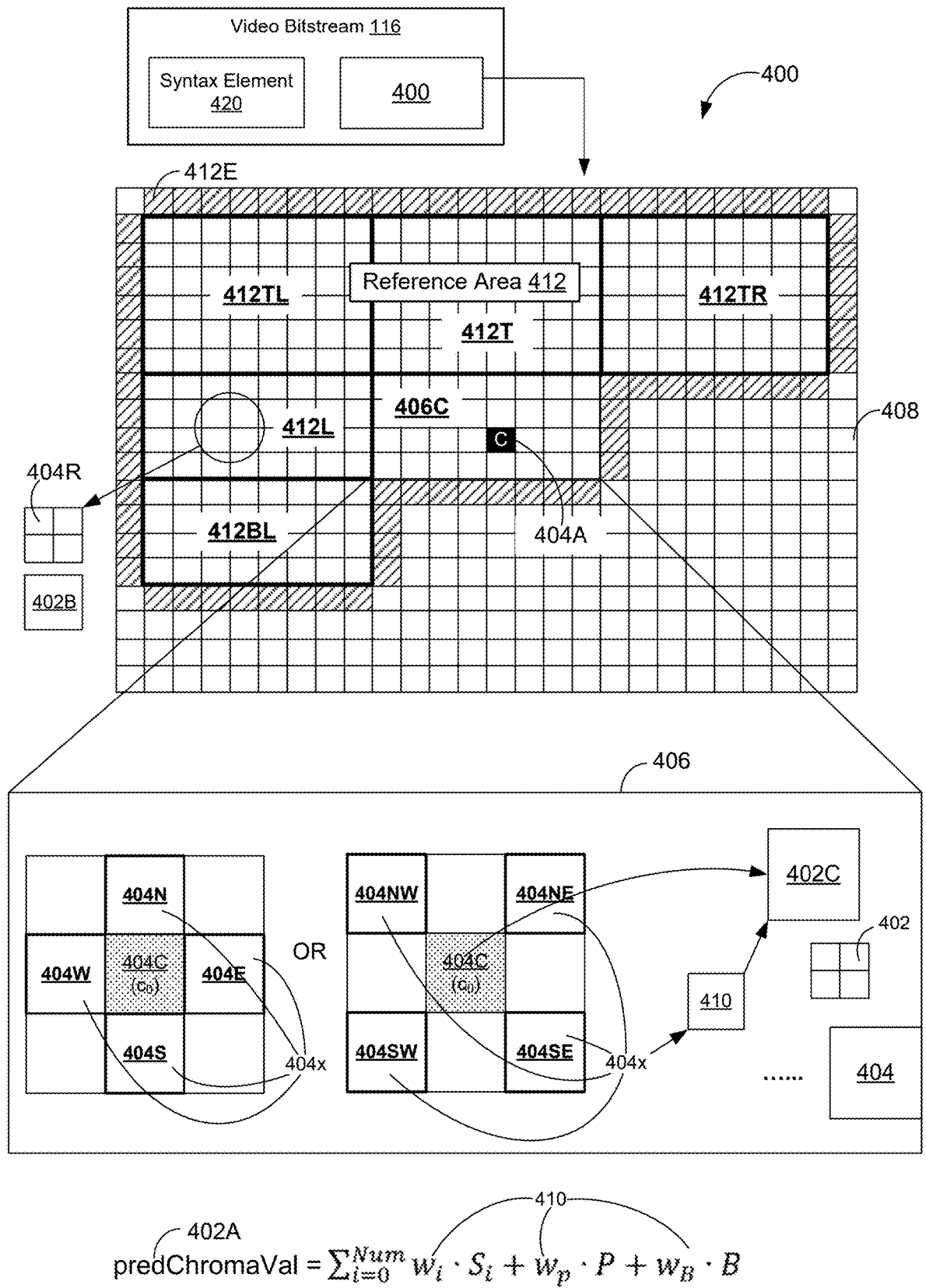
FIG. 4 illustrates an example scheme for generating a first chroma sample from one or more luma samples in a CCP mode (e.g., a multi-hypothesis CCP (MH-CCP) mode), in accordance with some embodiments.

FIG. 4 illustrates an example scheme 400 for generating a first chroma sample 402A from one or more luma samples 404 (e.g., 404A and 404X) in a CCP mode (e.g., a multi-hypothesis CCP (MH-CCP) mode), in accordance with some embodiments. In some embodiments, a video bitstream 116 includes a current coding block 406C of the current image frame 408 and a syntax element 420 for the CCP mode. The syntax element 420 indicates whether to reconstruct the first chroma sample 402A of the current coding block 406C based on a set of one or more luma samples 404 of a reference coding block based on a plurality of model parameters 410. Referring to FIG. 4, in an example, the reference coding block is the current coding block 406C itself. In some embodiments, the syntax element 420 is signaled in the video bitstream 116 at one of a block level, a superblock level, an image frame level, a slice level, a tile level, and an image sequence level for the current coding block 406C.

In some embodiments (FIG. 4), the CCP mode includes a cross-component intra prediction (CCIP) mode, and a current coding block 406C of a current image frame 408 is coded in the CCIP mode. In the CCIP mode, the current coding block 406C includes a chroma block, and corresponds to a reference coding block including a co-located luma block. A decoder 122 (FIG. 2B) determines each of a plurality of chroma samples 402 of the current coding block 406C based on one or more luma samples 404 of the reference coding block that have been reconstructed. In some situations, the CCIP mode includes a cross-component linear model (CCLM) mode in which a first chroma sample 402A is converted from a reconstructed luma sample 404A that is co-located with the chroma sample 402A based on a linear model. Alternatively, in some situations, the CCIP mode includes a convolutional cross-component mode (CCCM) in which a first chroma sample 402A is predicted directly from a plurality of reconstructed luma samples 404X that is located adjacent to the first luma sample 404A based on a filter shape of a filter. Alternatively and additionally, in some situations, the CCIP mode includes the MH-CCP mode in which a first chroma sample 402A is generated by combining at least the first luma sample 404A that is collocated with the first chroma sample 402A and a plurality of hypothesis values using a plurality of weighing factors. The plurality of neighboring luma samples 404X of the first luma sample 404A are combined using a plurality of coefficients to generate the plurality of hypothesis values. Stated another way, in the MH-CCP mode, the first luma sample 404A and the plurality of neighboring luma samples 404X are combined using a plurality of model parameters 410 (which are associated with the weighing factors and the coefficients) to generate the first chroma sample 402A. The first chroma sample 402A is a blue-difference chroma (Cb) sample or a red-difference chroma (Cr) component.

In some embodiments, a video bitstream 116 includes a syntax element 420 for an MH-CCP mode. The first chroma sample 402A of the current coding block 406C is configured to be generated by combining at least the first luma sample 404A that is co-located with the first chroma sample 402A and one or more neighboring luma samples 404X of the first luma sample 404A using a plurality of model parameters (e.g., $w_i$, $w_p$, $w_B$). In accordance with a determination that the MH-CCP mode is applied, the first chroma sample 402A is predicted according to the following model:

$$predChromaVal = \sum_{i=0}^{Num} w_i \cdot S_i + w_P \cdot P + w_B \cdot B \quad (1)$$

where predChroma Val is a predicted chroma value of the first chroma sample 402A; Num is a total number of neighboring luma samples 404X; $S_i$ is a luma value of the first luma sample 404A (where i is equal to 0) or a neighboring luma sample 404X (where i is greater than 0), which is indexed by i; P is a nonlinear term; B is an offset term; and $w_i$, $w_p$, $w_B$ are model parameters. In an example, the non-linear term P is equal to equal to (C×C+B)>>bit_depth, where bit_depth is the number of bits needed to represent luma samples of the current image frame 408 during encoding and decoding. In some embodiments, B is a median luma value, a middle luma value, or an average luma value of the luma samples 404 of the current coding block 406C. In another example, B is equal to 1<< (bit_depth−1). In the MH-CCP mode, the chroma samples 402 of the current coding block 406C do not need to be transmitted in the video bitstream 116, thereby conserving a communication bandwidth of a video codec.

In some embodiments, each of the one or more neighboring luma samples 404X of the first luma sample 404A is immediately adjacent to, and shares at least one respective side or vertex with, the first luma sample 404A. In some embodiments, the one or more neighboring luma samples 404X include a subset or all of a north neighboring luma sample (also called a top luma sample) 404N, a south neighboring luma sample (also called a bottom luma sample) 404S, a west neighboring luma sample (also called a left luma sample) 404W, an cast neighboring luma sample (also called a right luma sample) 404E, a northwest neighboring luma sample (also called a top left luma sample) 404NW, a southeast neighboring luma sample (also called a bottom right luma sample) 404SE, a southwest neighboring luma sample (also called a bottom left luma sample) 404SW, and a northeast neighboring luma sample (also called a top right luma sample) 404NE.

In some embodiments, equation (1) includes five terms, and represents a five tap model for determining the first chroma sample 402A of the current coding block 406C based on three linear terms (e.g., associated with the first luma sample 404A and neighboring luma samples 404W and 404E), the nonlinear term P, and the offset term B in the MH-CCP mode. Alternatively, in some embodiments, equation (1) includes seven terms, and represents a seven tap model for determining the first chroma sample 402A of the current coding block 406C based on three linear terms (e.g., associated with luma samples 404A, 404W, 404E, 404N, and 404S), the nonlinear term P, and the offset term B in the MH-CCP mode.

In some embodiments, luma samples 404 and chroma samples 402 of the current coding block have different resolutions corresponding to a chroma subsampling scheme (e.g., 4:2:2 or 4:2:0). Each luma sample 404 includes a downsampled luma sample generated from reconstructed luma samples using a downsampling filter. Alternatively, in some embodiments, each luma sample 404 includes an original or reconstructed luma sample without any downsampling. That said, the first luma sample 404A is reconstructed according to a resolution of luma samples or downsampled to a resolution of chroma sample, so are neighboring luma samples 404X (e.g., 404N, 404W, 404E, 404S, 404NW, 404NE, 404SW, 404SE) either reconstructed according to a resolution of luma samples or downsampled to a resolution of chroma sample.

In some embodiments, the plurality of model parameters $w_i$, $w_p$, $w_B$ are determined based on a set of one or more reference luma samples 404R and a set of one or more co-located reference chroma samples 402R within a reference area 412 of the current coding block 406C. The reference area 412 is located in the current image frame 408. Further, in some embodiments, the reference luma samples 404R of the reference area 412 are combined to re-generate one or more chroma samples 402A based on equation (1). In some embodiments, the set of one or more co-located reference chroma samples 402R and the one or more re-generated chroma samples are compared to generate a least mean square (LMS) value. The plurality of model parameters $w_i$, $w_p$, $w_B$ are iteratively adjusted to reduce the LMS value, until the LMS value satisfies a predefined criterion (e.g., in which the LMS value is below a threshold LMS value or is minimized).

In some embodiments, the plurality of model parameters $w_i$, $w_p$, or $w_B$ are at least partially derived based on chroma samples and luma samples within the reference area 412 of the current coding block 406C, and the reference area 412 includes one or more coding blocks (e.g., 4 coding blocks in FIG. 4) that are decoded prior to, the current coding block 406C. In some embodiments, a subset of the one or more coding blocks is immediately adjacent to the current coding block 406C. In some embodiments, a subset of the one or more coding blocks are separated from the current coding block 406C by one or more coding blocks. In some embodiments, the reference area 412 includes at least a portion of one or more rows above the current coding block 406C and/or a portion of one or more columns to the left of the current coding block 406C. For example, referring to FIG. 4, the reference area 412 includes seven rows of luma samples 404R above the current coding block 406C and nine columns of luma samples 404R to the left of the current coding block 406C. The reference area 412 may include a padded row and a padded column (e.g., shaded in FIG. 4).

Additionally, in some embodiments, the reference area 412 of the current coding block 406C includes one or more of: a top left reference region 412TL, a top reference region 412T, a top right reference region 412TR, a bottom left reference region 412BL, and a left reference region 412L. In an example, the reference area 412 includes the top reference region 412T and the left reference region 412L. Each of the reference regions includes one or more coding blocks. Stated another way, in some embodiments, the reference area 412 includes at least a portion of a plurality of rows above the current coding block 406 and/or a portion of a plurality of columns to the left of the current coding block 406. For example, referring to FIG. 4, the reference area 412 includes a first portion of 6 rows of chroma samples above the current coding block 406C and a second portion of 8 columns of chroma samples to the left of the current coding block 406C. A column number of the first portion is determined by a column number of the current coding block 406C, and a row number of the second portion is determined by a row number of the current coding block 406C. In some embodiments, the reference area 412 extends one coding block width to the right of a right boundary of the current coding block 406, and one coding block height below a bottom boundary of the current coding block 406. In some embodiments, the reference area 412 is adjusted to include only available samples. Extensions 412E to the reference area 412 are padded in unavailable areas to provide side samples of a filter.

In some embodiments, the reconstructed luma samples 404R and chroma samples 402R of the reference area 412 are used to generate the model parameters in the CCP mode. The reference area 412 may be L-shaped, including bottom left, left, top left, above and above right reference regions. The reference area 412 has a first integer number K (e.g., 6) of reference lines above the current coding block 406C and a second integer number L (e.g., 8) columns to the left of the current coding block 406C. Extensions 412E to the reference area 412 include padded pixels for the reference samples.

Figure 5A:
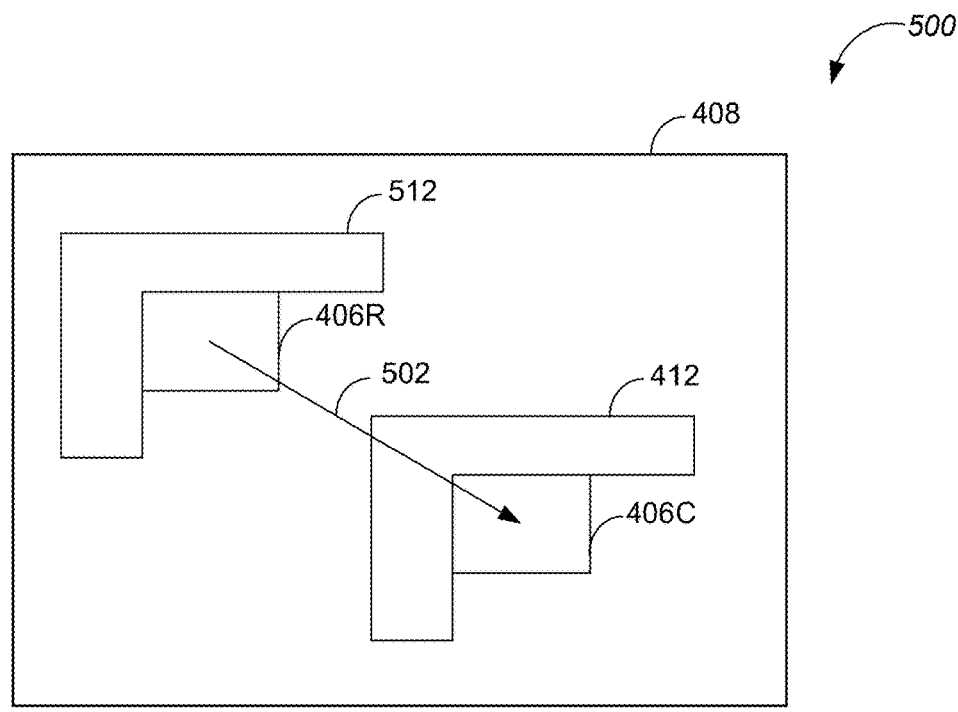
FIGS. 5A and 5B illustrate two example schemes 550 having a reference coding block distinct from a current coding block in a mode, in accordance with some embodiments.
Figure 5B:
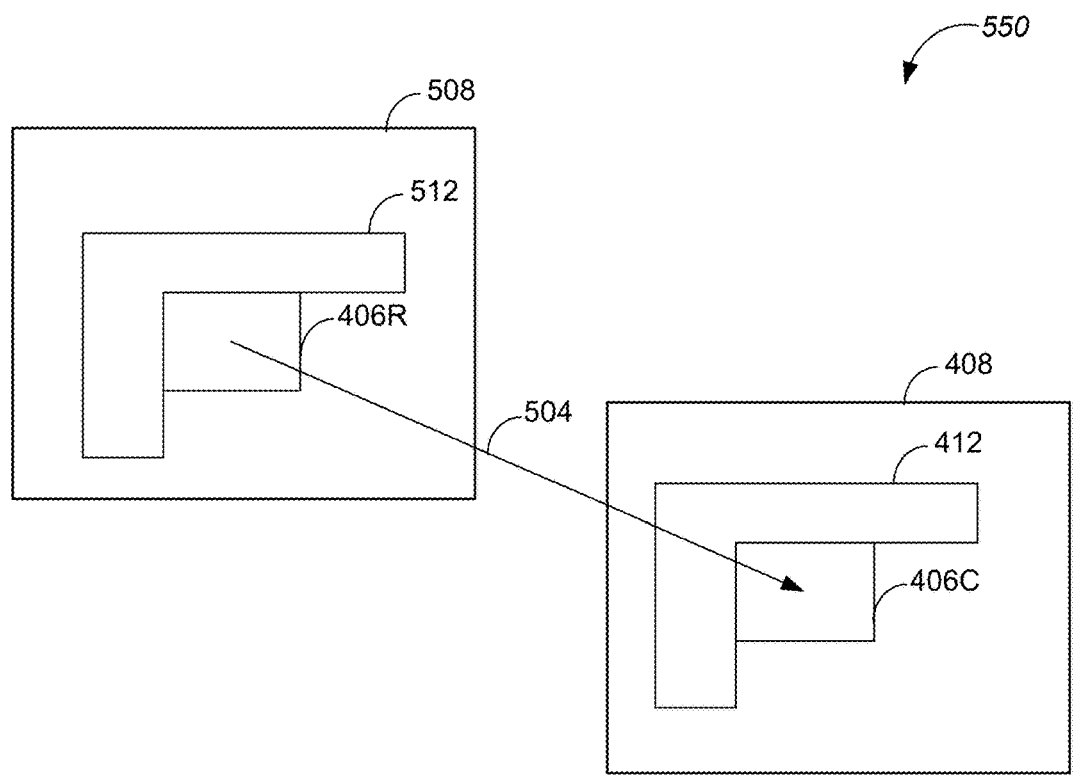

FIGS. 5A and 5B illustrate two example schemes 500 and 550 having a reference coding block 406R distinct from a current coding block 406C in a CCP mode, in accordance with some embodiments. Referring to FIG. 5A, in some embodiments, an intra prediction mode includes one of an intra block copy mode and an intra template matching mode. Samples of the current coding block 406C are associated with samples of the reference coding block 406R using a block vector 502 in the same current image frame 408. The block vector 502 can be signaled (e.g., intra block copy) or implicitly derived (e.g., using template matching). Referring to FIG. 5B, in some embodiments an inter prediction mode corresponds to an illumination compensation mode. Samples of the current coding block 406C of the current image frame 408 are associated with samples of the reference coding block 406R of a reference image frame 508 using a motion vector 504.

Referring to FIGS. 5A and 5B, in some embodiments, the reference coding block 406R in the inter or intra prediction mode does not overlap the current coding block 406C, and corresponds to a distinct neighboring area 512. The neighboring area 512 of the reference coding block 406R matches the reference area 412 of the current coding block 406C. Samples of the neighboring area 512 of the reference coding block 406R are applied jointly with samples of the reference area 412 of the current coding block 406C to determine the plurality of model parameters 410, e.g., based on a least mean square optimization. In some embodiments, the samples of at least the reference area 412 of the current coding block 406C are downsampled prior to being applied to determine the model parameters 410. Further, in some embodiments, the samples of both the neighboring area of the reference coding block and the reference area 412 of the current coding block 406C are downsampled.

Figure 6A:
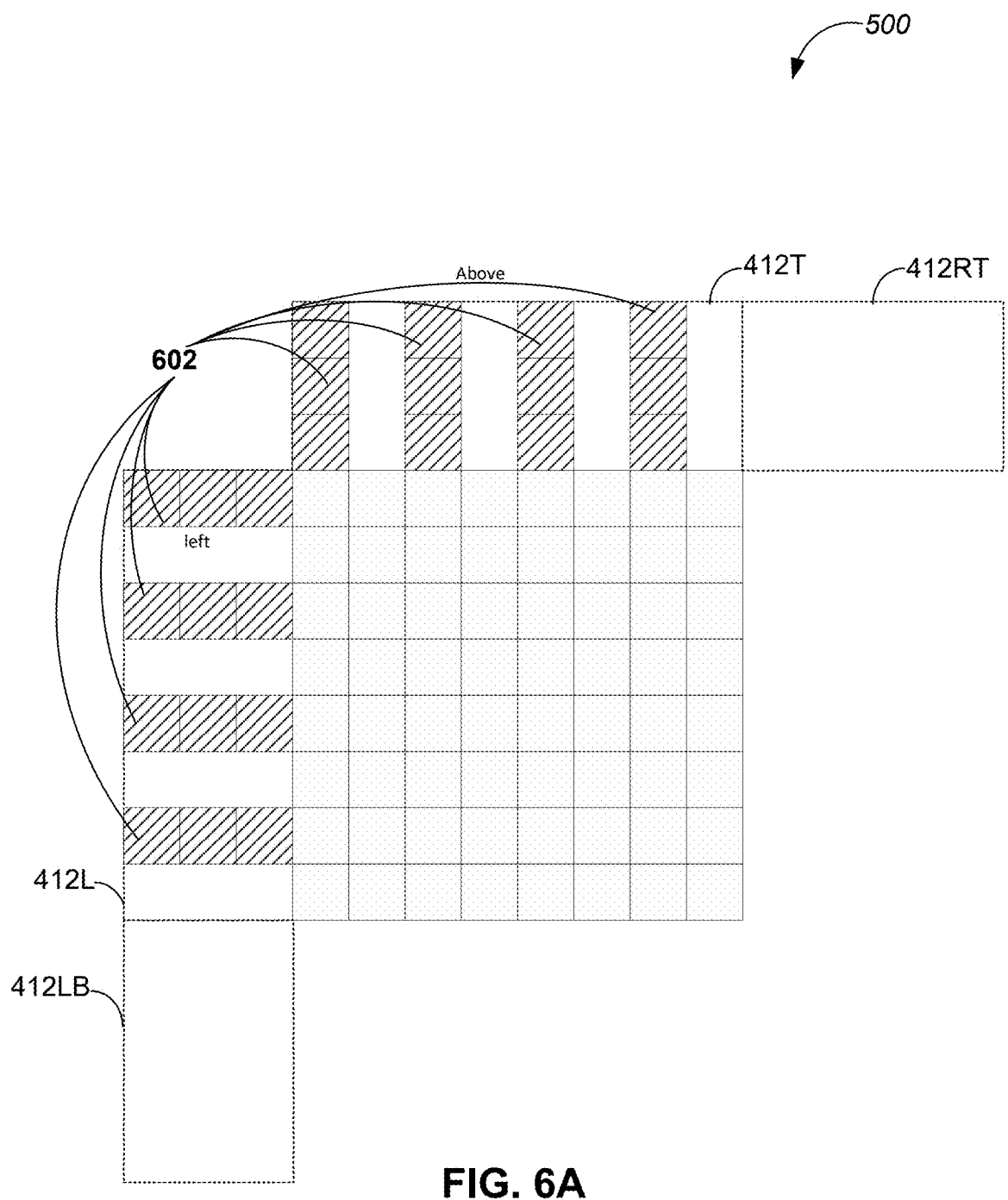
FIGS. 6A, 6B, and 6C illustrate three example downsampling schemes for downsampling a reference area of a current coding block, in accordance with some embodiments.
Figure 6B:
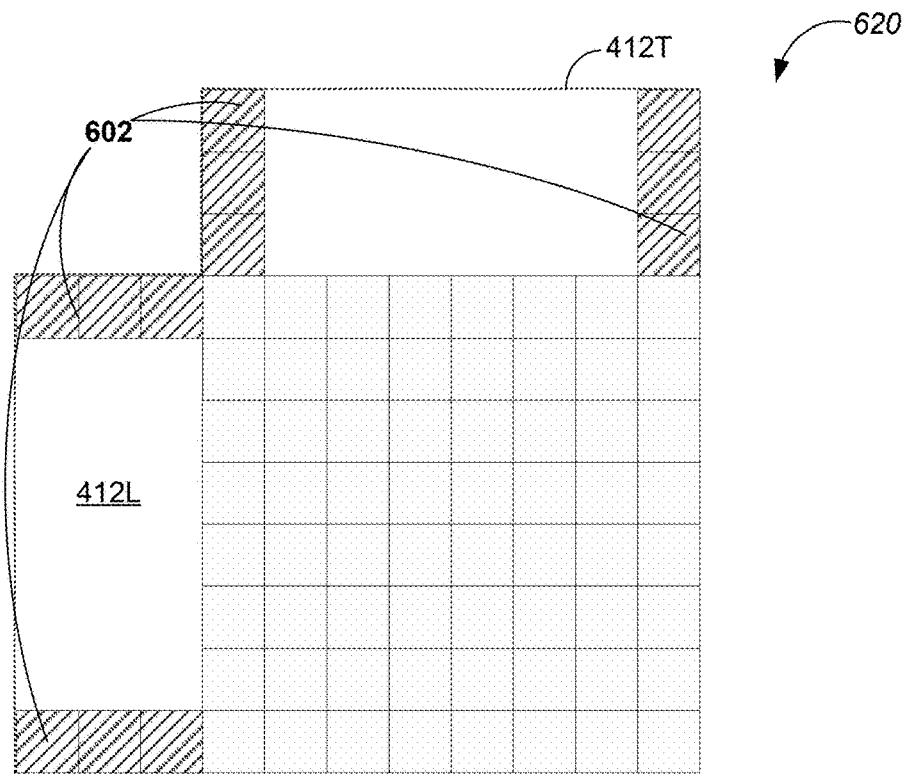
Figure 6C:
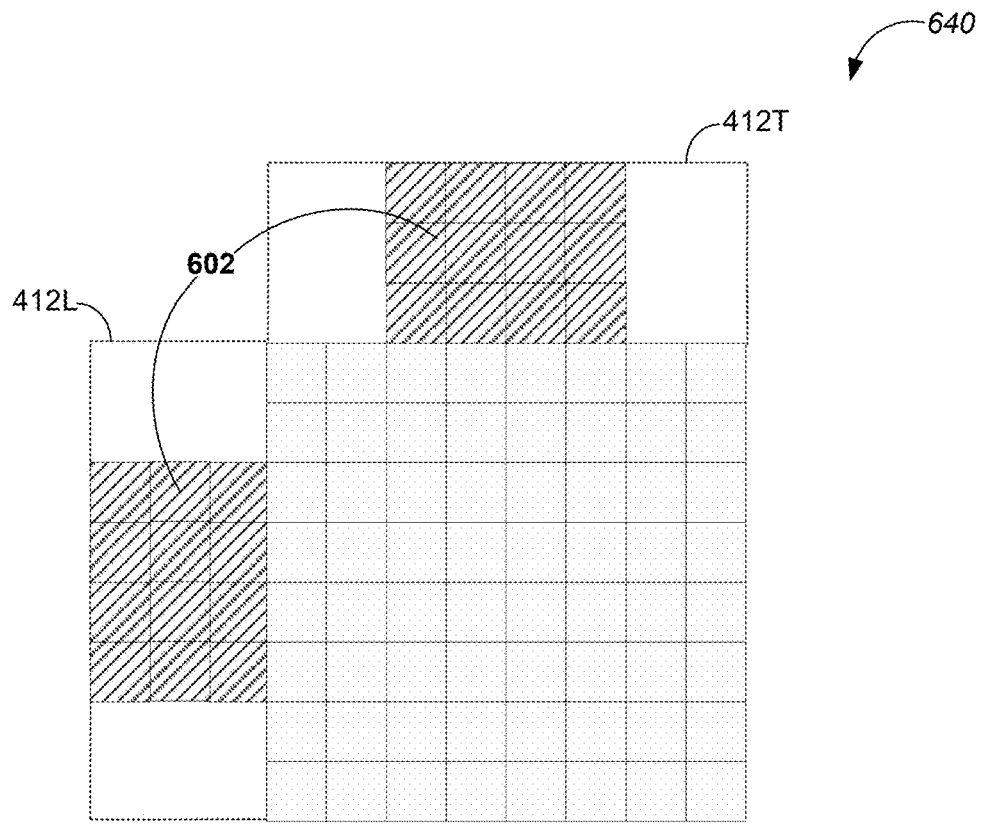

FIGS. 6A, 6B, and 6C illustrate three example downsampling schemes 600, 620, and 640 for downsampling a reference area 412 of a current coding block 406C, in accordance with some embodiments, respectively. In some embodiments, the downsampling schemes 600, 620, and 640 are applied to a neighboring area 512 of a reference coding block 406R of the current coding block 406C, e.g., when the reference coding block 406R does not overlap the current coding block 406C. A computing system (e.g., a decoder 122 in FIG. 2B) receives a video bitstream 116 including a current coding block 406C of a current image frame 408 and a syntax element 420 (FIG. 4) for a CCP mode. Based on the syntax element 420, the CCP mode is enabled to reconstruct a first chroma sample 402A of the current coding block 406C based on a set of one or more luma samples 404 (e.g., of a reference coding block 406R). A reference area 412 of at least the current coding block 406C is identified, and downsampled to identify samples of a subset of reference area 602. A plurality of model parameters 410 used in the CCP mode for the first chroma sample of the current coding block 406C are determined based on the samples of the subset of reference area 602. The set of one or more luma samples 404 are further combined using the plurality of model parameters 410 to generate the first chroma sample 402 of the current coding block 406C. The current image frame 408 is reconstructed based on the first chroma sample 402A of the current coding block 406C.

Referring to FIG. 6A, in some embodiments, the reference area 412 (FIG. 4) includes a top reference region 412T located immediately above the current coding block 406C. The computing system periodically selects one column of samples among every N columns of samples in the top reference region 412T, wherein N is an integer greater than 1, and includes selected samples in the subset of reference area 602. For example, one column of samples is selected from every two columns of samples in the top reference region 412T. Alternatively or additionally, in some embodiments, the computing system periodically selects one column of samples among every N columns of samples in a top right reference region 412TR.

Alternatively or additionally, in some embodiments, the reference area 412 (FIG. 4) includes a left reference region 412L located immediately to the left of the current coding block 406C. The computing system periodically selecting one row of samples among every M rows of samples in the left reference region 412L, wherein M is an integer greater than 1, and includes the selected samples in the subset of reference area 602. Alternatively or additionally, in some embodiments, the computing system periodically selects one row of samples among every M rows of samples in a bottom left reference region 412BL. In some embodiments, samples are selected from both the top reference region 412T and the left reference region 412L, and M and N are optionally equal to, or different from, one another.

Referring to FIG. 6B, in some embodiments, the computing device selects, in the top reference region 412T, a first number (e.g., 1) of leftmost columns of samples and the first number of rightmost columns of samples as the subset of reference area 602. Conversely, referring to FIG. 6C in some embodiments, the computing device selects, in the top reference region, a set of successive columns of samples and excludes a first number (e.g., 1) of leftmost columns of samples and the first number of rightmost columns of samples. The selected samples are included in the subset of reference area 602.

In some embodiments not shown, a first number (e.g., 1) of leftmost columns of samples and the first number of rightmost columns of samples of the top right reference region 412TR are selected as the subset of reference area 602. In some embodiments not shown, a set of successive columns of samples (which excludes a first number (e.g., 1) of leftmost columns of samples and the first number of rightmost columns of samples) of the top right reference region 412TR are selected as the subset of reference area 602.

Referring to FIG. 6B, in some embodiments, the computing device selects, in the left reference region 412L, a second number (e.g., 1) of topmost rows of samples and the second number of bottommost rows of samples as the subset of reference area 602. Conversely, referring to FIG. 6C in some embodiments, the computing device selects, in the left reference region 412L, a set of successive rows of samples, excluding a second number (e.g., 1) of topmost rows of samples and the second number of bottommost rows of samples. The selected samples are included in the subset of reference area 602.

In some embodiments not shown, the computing device selects, in the bottom left reference region 412BL, a second number (e.g., 1) of topmost rows of samples and the second number of bottommost rows of samples as the subset of reference area 602. Conversely, referring to FIG. 6C in some embodiments, the computing device selects, in the bottom left reference region 412BL, a set of successive rows of samples, excluding a second number (e.g., 1) of topmost rows of samples and the second number of bottommost rows of samples. The selected samples are included in the subset of reference area 602.

Figure 7A:
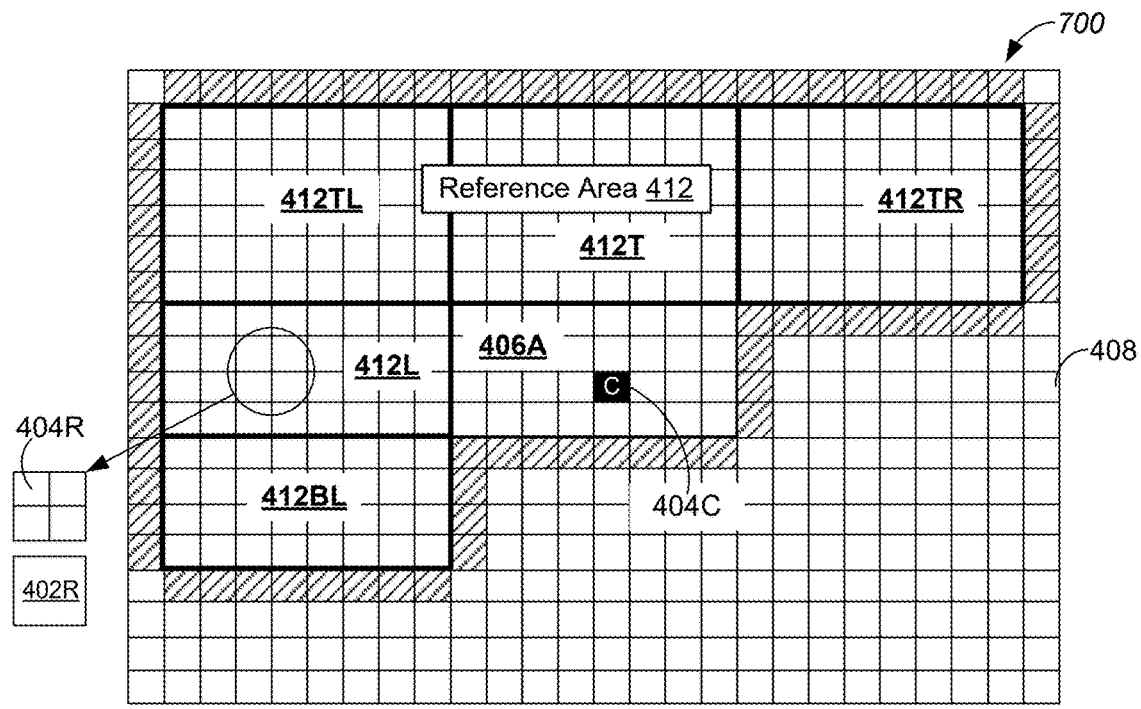
FIGS. 7A and 7B illustrate an example process including different options of downsampling a reference area to generate a subset of reference area, in accordance with some embodiments.
Figure 7B:
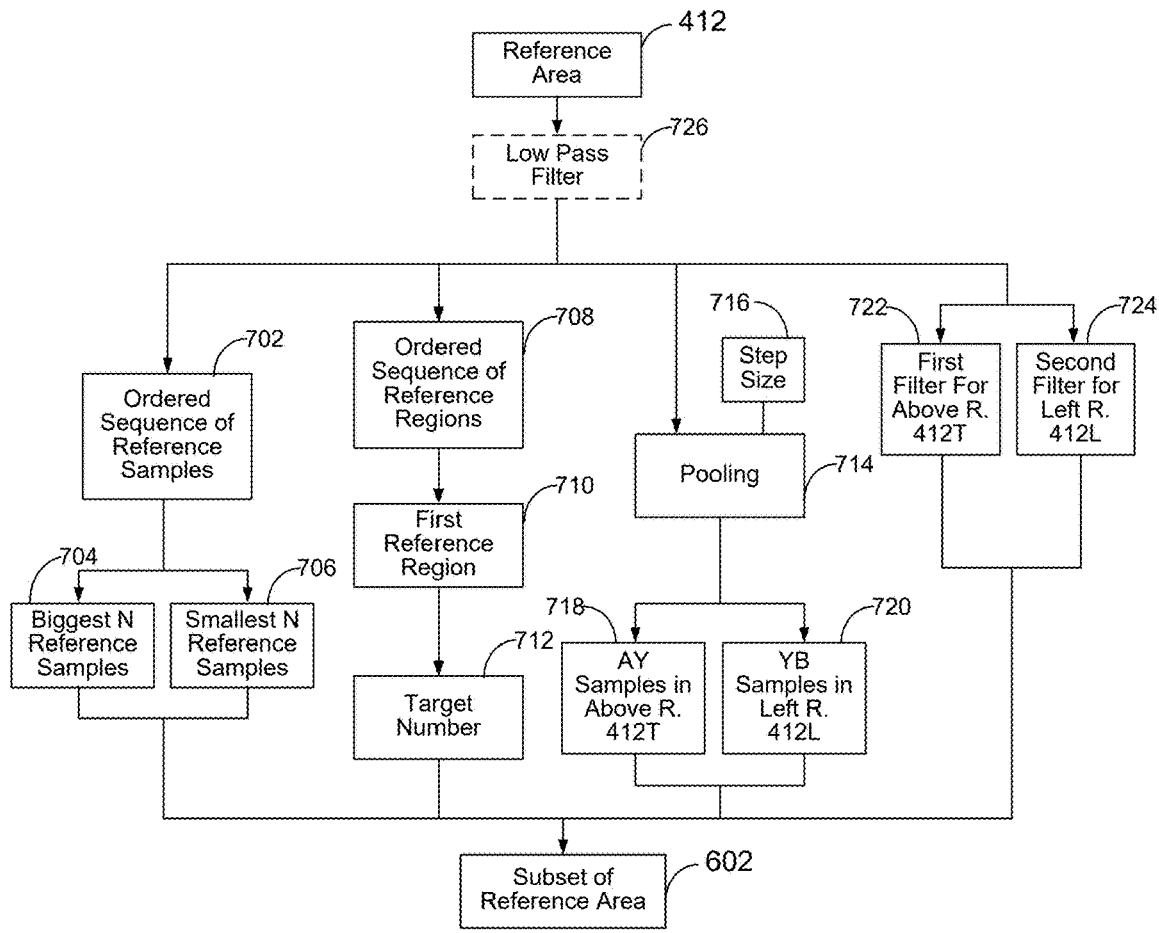

FIG. 7 illustrates an example process 700 including different options of downsampling a reference area 412 to generate a subset of reference area 602, in accordance with some embodiments. The reference area 412 of the current coding block 406C is identified, and downsampled to identify samples of a subset of reference area 602. A plurality of model parameters 410 used in the CCP mode for the first chroma sample of the current coding block 406C are determined based on the samples of the subset of reference area 602. In some embodiments, the reference area 512 of the reference coding block 406R (FIG. 5A or 5B) is also downsampled according to a scheme, which is identical to or different from a scheme (e.g., scheme 600, 620, or 640 in FIGS. 6A-6C) used to downsample the reference area 412 of the current coding block 406C. A subset of the reference area 512 of the reference coding block 406R is applied jointly with the subset of reference area 602 to determine the plurality of model parameters 410.

In some embodiments, the computing system organizes the samples of the reference area 412 based on associated sample values, forming an ordered sequence of reference samples 702. A first subset of largest samples 704 and a second subset of smallest samples 706 are identified among the samples of the reference area 412, and included in the subset of reference area 602 for use in determination of the plurality of model parameters 410.

In some embodiments, the reference area 412 includes an ordered sequence of reference regions 708. The computing system determine a target number 712 (e.g., 1000), and selects the target number 712 of samples in one or more reference regions (e.g., regions 412T and 412L in FIGS. 4 and 6A-6C) based on the ordered sequence of reference regions 708. The target number 712 of samples are included in the subset of reference area 602. Further, in some embodiments, the ordered sequence of reference regions 708 are arranged based on respective distances from the current coding block 406C. In an example, a distance of a top reference region 412T is measured from a center of the top reference region 412T to a center of the current coding block 406C. In another example, a distance of a top reference region 412T is measured from a center of the top reference region 412T to a closest edge (e.g., a top edge) of the current coding block 406C.

In some embodiments, samples of the subset of reference area 602 are successively selected from the ordered sequence of reference regions 708 until the target number 712 of samples is reached. A first reference region 710 is partially selected, and each selected sample of the first reference region 710 is closer to, or has an equal distance from, the current coding block 406C compared with unselected samples. Conversely, in some embodiments, a first reference region 710 is partially selected, and each unselected sample of the first reference region 710 is closer to, or has an equal distance from, the current coding block 406C compared with selected samples. In an example, a distance of each sample of the first reference region 710 is measured from a center of the respective sample to a closest point on an edge separating the first reference region 710 and the current coding block 406C.

In some embodiments not shown, the reference area 412 is downsampled based on a filter scheme. The computing system determines one of a shape, a total pixel number, and an aspect ratio of the current coding block 406C and selects the filter scheme from a plurality of predefined schemes based on the one of one of the shape, the total pixel number, and the aspect ratio.

In some embodiments not shown, the reference area 412 is downsampled based on a filter scheme. The computing system determines a block size of the current coding block 406C and selects the filter scheme from a plurality of predefined schemes based on the block size. Further, in some embodiments, in accordance with a determination that the block size is greater than a threshold size, the computing system selects a first scheme as the filter scheme. The first scheme has a first selection rate. In accordance with a determination that the block size is not greater than a threshold size, the computing system selects a second scheme as the filter scheme. The second scheme has a second selection rate that is lower than the first selection rate.

In some embodiments, the computing system downsamples the reference area further comprises by applying a pooling operation 714 on each of one or more reference regions (e.g., regions 412TL, 412T, 412TR, 412L, 412BL) of the reference area 412. Further, in some embodiments, the pooling operation includes an average pooling operation or an max pooling operation. The pooling operation has a step size 716 (Y). The subset of reference area 602 includes A·Y samples 718 selected from a top reference region 412T or Y·B samples 720 selected from a left reference region 412L, wherein A is a total number of rows in the top reference region 412T, and B is a total number of columns in the left reference region 412L. More specifically, in an example, reference samples of each row of the top reference region 412T are grouped based on the step size 716 (Y). In another example, reference samples of each column of the left reference region 412L are grouped based on the step size 716 (Y). The pooling operation 714 represents each reference sample group with an average sample value or a maximum sample value of a set of respective reference samples.

Further, in some embodiments, the pooling operation 714 may be performed across one dimension or two dimensions (2D). For example, the step size 716 defines a 2D unit including 3×3 reference samples. Each reference sample is a center of a respective 2D unit, and an average sample value or a maximum sample value of the reference samples of the respective 2D unit is generated to downsample corresponding 3×3 reference samples.

In some embodiments, the reference area 412 includes a top reference region 412T and a left reference region 412L. The top reference region 412T is downsampled according to a first scheme 722 (e.g., scheme 600, 620, or 640 in FIG. 6A). The left reference region 412L is downsampled according to a second scheme 724 (e.g., scheme 600, 620, or 640 in FIG. 6A). The second scheme 724 may be identical to the first scheme 722. The second scheme 724 may be different from the first scheme 722.

In some embodiments, a low-pass filter 726 is applied to reference samples (e.g., luma samples 404R, chroma samples 402R) of the reference area 412. Examples of the low-pass filter 726 includes, but are not limited to, an averaging filter and a smoothing filter. For example, each reference sample is represented to an average of a left neighboring sample, the respective reference sample, and an immediately right neighboring sample.

Figure 8:
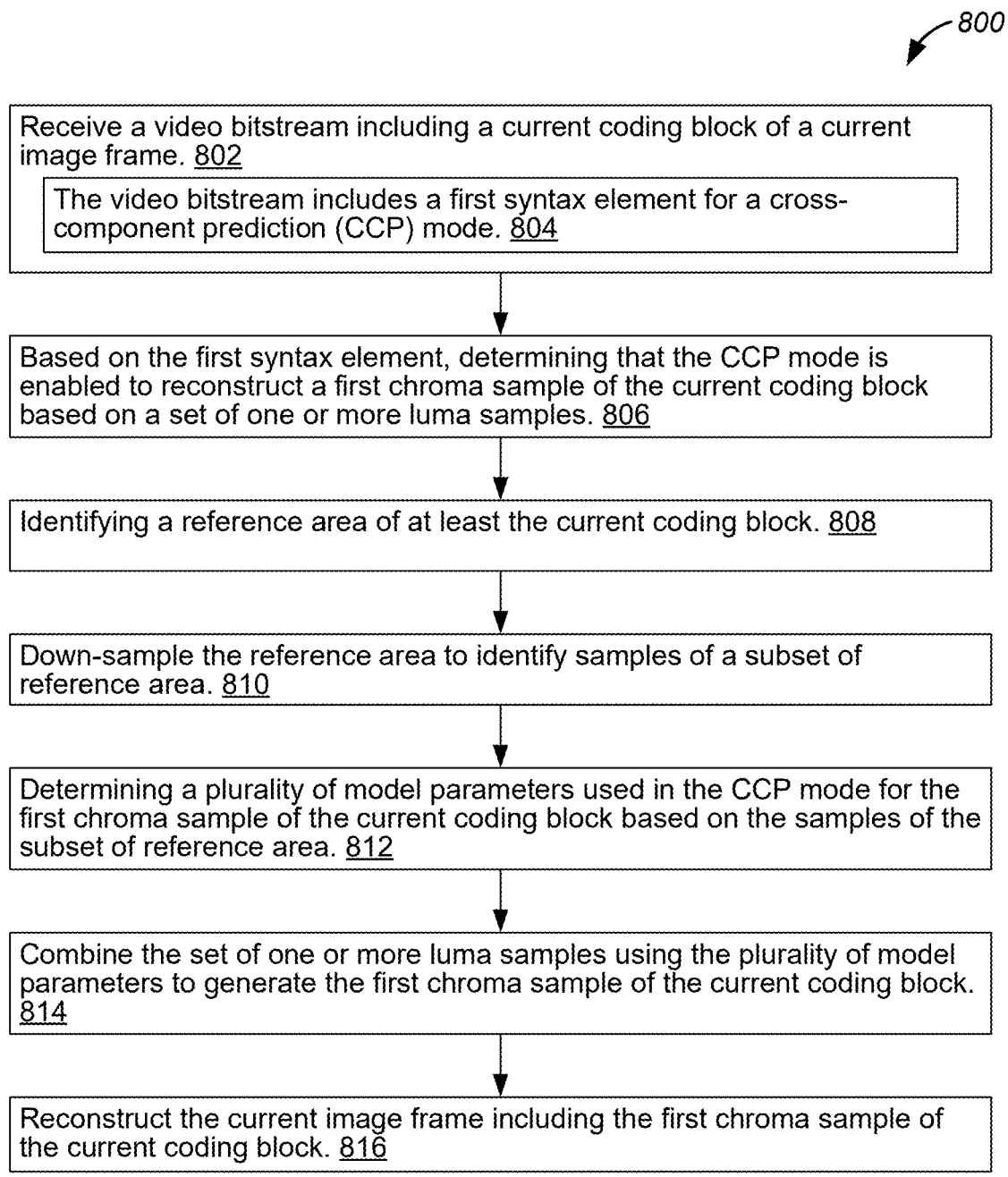
FIG. 8 is a flow diagram illustrating an example method of coding video, in accordance with some embodiments.

FIG. 8 is a flow diagram illustrating an example method 800 of decoding video, in accordance with some embodiments. The method 800 may be performed at a computing system (e.g., the server system 112, the source device 102, or the electronic device 120) having control circuitry and memory storing instructions for execution by the control circuitry. In some embodiments, the method 800 is performed by executing instructions stored in the memory (e.g., the memory 314) of the computing system. In some embodiments, the method 800 is applied jointly with one or more video codecs, including but not limited to, H.264, H.265/HEVC, H.266/VVC, AV1 and AVS/AVS2/AVS3.

The method 800 is directed to downsampling reference data applied in reconstructing samples in a CCP mode. The reference data include reference samples of a reference area 412 of a current coding block 406C, a neighboring area 512 of a reference coding block 406R, or both. The reference data are applied to determine a plurality of model parameters 410 that are used to combine samples of a first color components of the reference coding block 406R in a weighted manner to generate samples of a second color component of the current coding block 406C. For example, in some embodiments, a weighted sum of multiple versions of co-located luma samples 404A (FIG. 4) are used to predict the chroma values 402A in the CCP mode (e.g., an MH-CCP mode), where the reference coding block 406R overlaps the current coding block 406C. The multiple versions of co-located luma samples 404A are derived from either the co-located luma sample 404A, or the filtered co-located luma sample using neighboring luma samples 404X (e.g., 404W, 404N, 404E, 404S, 404NW, 404NE, 404SW, 404SE) as filtering inputs. Each input (e.g., corresponding a respective version of co-located luma samples) to the weighted sum is called a hypothesis. In some situations, values of reference luma samples 404R and reference chroma samples 402R are fed into the least mean square calculation kernel to derive model parameters 410 used in the MH-CCP mode. In some embodiments, a first luma sample 404A has eight neighbors 404X (FIG. 4) that are immediately adjacent to the first luma sample 404A. Further, in some embodiments, each luma sample 404 (e.g., 404A, 404X) includes a downsampled luma sample generated using a downsampling filter, when luma and chroma have different dimensions, e.g., 4:2:2 or 4:2:0. Alternatively, each luma sample 404 includes an original co-located luma sample without any downsampling.

In some embodiments (e.g., FIG. 6A), the reference data (e.g., the reference area 412 in FIG. 4, the neighboring area 512 in FIG. 5) has a down sample rate of 1/N or 1/M. A reference sample is selected every N samples in each row or every M samples in each column. For example, one out of every two samples is selected on each row of reference samples in a top reference region 412T (FIG. 6A), and one out of every two samples is selected on each column of reference samples in a left reference region 412L (FIG. 6A).

In some embodiments (e.g., FIG. 6B), a set of corner samples 602 of a reference region of the reference data are selected for every row or column. For example, a first number of leftmost samples and the first number of rightmost samples are selected for each row of reference samples in a top reference region 412T. A second number of topmost samples and the second number of bottommost samples are selected for each column of reference samples in a left reference region 412L. Further, in some situations, selected samples of adjacent rows are aligned. Conversely, in some situations, selected samples of adjacent rows are not aligned.

In some embodiments (e.g., FIG. 6C), a set of middle samples 602 of a reference region of the reference data are selected for every row or column. For example, a first number of leftmost samples and the first number of rightmost samples are excluded, and a remaining set of middle samples is selected for each row of reference samples in a top reference region 412T. A second number of topmost samples and the second number of bottommost samples are excluded, and a remaining set of middle samples is selected for each column of reference samples in a left reference region 412L. Further, in some situations, selected samples of adjacent columns are aligned. Conversely, in some situations, selected samples of adjacent columns are not aligned.

In some embodiments, each row of a top right reference region 412TR is downsampled to select one out of a number of reference samples, a set of corner samples, or a set of middle samples as a subset of reference 602 used for model parameter determination. Further, in some situations, selected samples of adjacent rows are aligned. Conversely, in some situations, selected samples of adjacent rows are not aligned. In some embodiments, each column of a bottom left reference region 412BL is downsampled to select one out of a number of reference samples, a set of corner samples, or a set of middle samples as a subset of reference 602 used for model parameter determination. Further, in some situations, selected samples of adjacent columns are aligned. Conversely, in some situations, selected samples of adjacent columns are not aligned.

In some embodiments, the samples of the reference area 412 are sorted based on the value, the largest $N_1$ sample and smallest $N_2$ samples are selected to be included in in the subset of reference 602 used for model parameter determination, where $N_1$ and $N_2$ are positive integers.

In some embodiments, only a target number of samples are selected from the reference area 412.

In some embodiments, when selecting the target number of samples, a scan started from reference regions closest to the current coding block 406C. For example, the scan starts from reference regions located above the current coding block 406C and continues to reference regions located to the left of the current coding block 406C. The scan may select samples in the reference regions 412T, 412TR, 412L, and 412BL successively, e.g., until the target number of samples are selected. In another example, the scan starts from reference regions located to the left of the current coding block 406C and continues to reference regions located above the current coding block 406C. The scan may select samples in the reference regions 412L, 412BL, 412T, and 412TR successively, e.g., until the target number of samples are selected.

In some embodiments, when selecting the target number of samples, a scan started from reference regions located furthest to the current coding block 406C. For example, the scan starts from reference regions located above the current coding block 406C and continues to reference regions located to the left of the current coding block 406C. The scan may select samples in the reference regions 412TR, 412T, 412BL, and 412L successively, e.g., until the target number of samples are selected. In another example, the scan starts from reference regions located to the left of the current coding block 406C and continues to reference regions located above the current coding block 406C. The scan may select samples in the reference regions 412BL, 412L, 412TR, and 412T successively, e.g., until the target number of samples are selected In some embodiments, a downsampling filter is applied to downsample the reference data. The downsampling filter is selected based on a shape or an aspect ratio of the current coding block 406C.

In some embodiments, a downsampling filter is applied to downsample the reference data. The downsampling filter is selected based on a block size of the current coding block 406C. For example, the larger the block size of the current coding block 406C, the more aggressive a down sampling scheme.

In some embodiments, pooling is applied to downsample the reference samples of the reference area 412 (FIG. 4) or the neighboring area 512 (FIG. 5). For example, an average pooling operation or a max pooling operation may be applied with a step size 716. The pooling may be performed across one dimension or two dimensions. In an example, the top reference region 412T, a number of I×J reference samples are selected as the subset of reference 602 used for model parameter determination, where I is an original number of rows and J is a number of samples selected via pooling in each row. In an example, the left reference region 412L, a number of J×I samples are used, where I is the original number of columns and J is a number of samples selected via pooling in each column.

In some embodiments, one or more reference regions (e.g., 412T and 412TR) located above the current coding block 406C are downsampled with different schemes from one or more reference regions (e.g., 412L and 412BL) located to the left of the current coding block 406C. For example, the top reference region 412T is downsampled according the scheme 600 shown in FIG. 6A, while the left reference region 412L is downsampled according the scheme 620 shown in FIG. 6B. Conversely, in some embodiments, one or more reference regions (e.g., 412T and 412TR) located above the current coding block 406C are downsampled with the same scheme as one or more reference regions (e.g., 412L and 412BL) located to the left of the current coding block 406C, while having different parameters (e.g., down sample rate).

In some embodiments, before downsampling, a low-pass filter 726 (e.g., averaging filter, smoothing filter) is applied to process reference samples of the reference area 412.

Although FIG. 8 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 800 is implemented for decoding video data. The method 800 includes receiving (operation 802) a video bitstream including a current coding block of a current image frame, wherein the video bitstream includes (operation 804) a syntax element for a cross-component prediction (CCP) mode; based on the syntax element, determining (operation 806) that the CCP mode is enabled to reconstruct a first chroma sample of the current coding block based on a set of one or more luma samples; identifying (operation 808) a reference area of at least the current coding block; downsampling (operation 810) the reference area to identify samples of a subset of reference area; determining (operation 812) a plurality of model parameters used in the CCP mode for the first chroma sample of the current coding block based on the samples of the subset of reference area; combining (operation 814) the set of one or more luma samples using the plurality of model parameters to generate the first chroma sample of the current coding block; and reconstructing (operation 816) the current image frame including the first chroma sample of the current coding block.

(A2) In some embodiments of A1, the reference area includes a top reference region located immediately above the current coding block, and downsampling the reference area further comprises: periodically selecting one column of samples among every N columns of samples in the top reference region, wherein N is an integer greater than 1; and including selected samples in the subset of reference area.

(A3) In some embodiments of A1 or A2, the reference area includes a top reference region located immediately above the current coding block, and downsampling the reference area further comprises: selecting, in the top reference region, a first number of leftmost columns of samples and the first number of rightmost columns of samples; and including selected samples in the subset of reference area.

(A4) In some embodiments of any of A1-A3, the reference area includes a top reference region located immediately above the current coding block, and downsampling the reference area further comprises: selecting, in the top reference region, a set of successive columns of samples excluding a first number of leftmost columns of samples and the first number of rightmost columns of samples; and including selected samples in the subset of reference area.

(A5) In some embodiments of any of A1-A4, the reference area includes a left reference region located immediately to the left of the current coding block, and downsampling the reference area further comprises: periodically selecting one row of samples among every M rows of samples in the left reference region, wherein M is an integer greater than 1; and including selected samples in the subset of reference area.

(A6) In some embodiments of any of A1-A5, the reference area includes a left reference region located immediately to the left of the current coding block, and downsampling the reference area further comprises: selecting, in the left reference region, a second number of topmost rows of samples and the second number of bottommost rows of samples; and including selected samples in the subset of reference area.

(A7) In some embodiments of any of A1-A6, the reference area includes a left reference region located immediately to the left of the current coding block, and downsampling the reference area further comprises: selecting, in the left reference region, a set of successive rows of samples excluding a second number of topmost rows of samples and the second number of bottommost rows of samples; and including selected samples in the subset of reference area.

(A8) In some embodiments of any of A1-A7, downsampling the reference area further comprises: organizing the samples of the reference area based on associated sample values; identifying a first subset of largest samples and a second subset of smallest samples among the samples of the reference area; and including the first subset of largest samples and the second subset of smallest samples in the subset of reference areas.

(A9) In some embodiments of any of A1-A8, the reference area includes an ordered sequence of reference regions, and downsampling the reference area further comprises: determining a target number; selecting the target number of samples in one or more reference regions based on the ordered sequence of reference regions; and including the target number of samples in the subset of reference area.

(A10) In some embodiments of A9, wherein the ordered sequence of reference regions are arranged based on respective distances from the current coding block.

(A11) In some embodiments of A9 or A10, a first reference region is partially selected, and each selected sample of the first reference region is closer to, or has an equal distance from, the current coding block compared with unselected samples.

(A12) In some embodiments of any of A9-A11, wherein a first reference region is partially selected, and each unselected sample of the first reference region is closer to, or has an equal distance from, the current coding block compared with selected samples.

(A13) In some embodiments of any of A1-A12, the reference area is downsampled based on a filter scheme, and the method further comprises: determining one of a shape, a total pixel number, and an aspect ratio of the current coding block; and selecting the filter scheme from a plurality of predefined schemes based on the one of one of the shape, the total pixel number, and the aspect ratio.

(A14) In some embodiments of any of A1-A13, the reference area is downsampled based on a filter scheme, and the method further comprises: determining a block size of the current coding block; and selecting the filter scheme from a plurality of predefined schemes based on the block size.

(A15) In some embodiments of A14, wherein selecting the filter scheme further comprises: in accordance with a determination that the block size is greater than a threshold size, selecting a first scheme as the filter scheme, the first scheme having a first selection rate; and in accordance with a determination that the block size is not greater than a threshold size, selecting a second scheme as the filter scheme, the second scheme having a second selection rate that is lower than the first selection rate.

(A16) In some embodiments of any of A1-A15, downsampling the reference area further comprises: applying a pooling operation on each of one or more reference regions of the reference area.

(A17) In some embodiments of A16, wherein: the pooling operation includes an average pooling operation or an max pooling operation; the pooling operation has a step size Y; and the subset of reference area includes A. Y samples selected from a top reference region or Y. B samples selected from a left reference region, wherein A is a total number of rows in the top reference region, and B is a total number of columns in the left reference region.

(A18) In some embodiments of any of A1-A17, the reference area includes a top reference region and a left reference region, and downsampling the reference area further comprises, independently: downsampling the top reference region according to a first scheme; and downsampling the left reference region according to a second scheme.

(A19) In some embodiments of any of A1-A18, the method 800 further includes, prior to downsampling the reference area: applying a low-pass filter to samples of the reference area.

(A20) In some embodiments of any of A1-A19, the set of one or more luma samples includes a first luma sample that is collocated with the first chroma sample and one or more neighboring luma samples of the first luma sample, and the plurality of model parameters include a plurality of weighing factors, and generating the first chroma sample further comprises: generating a plurality of hypothesis values based on the first luma sample and the one or more neighboring luma samples; and combining the plurality of hypothesis values, a nonlinear term of a subset of the first luma sample and the one or more neighboring luma samples, and an offset term based on the plurality of weighing factors to generate the first chroma sample.

(A21) In some embodiments of A20, determining the plurality of model parameters further comprising: determining a least mean square (LMS) value based on the samples of the subset of reference area; and iteratively adjusting the plurality of weighing factors to reduce the LMS value until the LMS value satisfy a predefined criterion.

(A22) In some embodiments of any of A1-A21, the current coding block is encoded based on intra prediction, and a reference coding block is identified in the current image frame by a block vector with reference to the current coding block, and wherein the reference area further includes a neighboring area that is located immediately adjacent to the reference coding block of the current coding block.

(A23) In some embodiments of any of A1-A22, the current coding block is encoded based on inter prediction, and a reference block is identified in a distinct reference image frame based on a motion vector with reference to the current coding block, and wherein the reference area includes a neighboring area that is located immediately adjacent to the reference coding block in the reference image frame.

(A24) In some embodiments, a method includes receiving video data comprising a current coding block of a current image frame; encoding the current image frame; transmitting the encoded current image frame via a video bitstream; and signaling, via the video bitstream, a syntax element for a cross-component prediction (CCP) mode indicating whether to reconstruct a first chroma sample of the current coding block based on a first luma sample and a set of associated neighboring luma samples; wherein when the CCP mode is enabled, a reference area of the current coding block is downsampled and applied to determine a plurality of model parameters used in the CCP mode.

(A25) In some embodiments of A24, the method is implemented to enable the features of any of A2-A23.

(A26) In some embodiments, a method includes obtaining a source video sequence including a current image frame having a current coding block; and performing a conversion between the source video sequence and a video bitstream, wherein the video bitstream comprises: the current image frame having the current coding block; and a syntax element for a cross-component prediction (CCP) mode indicating whether to reconstruct a first chroma sample of the current coding block based on a first luma sample and a set of associated neighboring luma samples; wherein when the CCP mode is enabled, a reference area of the current coding block is downsampled and applied to determine a plurality of model parameters used in the CCP mode.

(A27) In some embodiments of A26, the method is implemented to enable the features of any of A2-A23.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A27 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A27 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a video bitstream including a current coding block of a current image frame, wherein the video bitstream includes a syntax element for a cross-component prediction (CCP) mode;
   based on the syntax element, determining that the CCP mode is enabled to reconstruct a first chroma sample of the current coding block based on a set of one or more luma samples;
   identifying a reference area of at least the current coding block;
   downsampling the reference area to identify samples of a subset of reference area;
   determining a plurality of model parameters used in the CCP mode for the first chroma sample of the current coding block based on the samples of the subset of reference area;
   combining the set of one or more luma samples using the plurality of model parameters to generate the first chroma sample of the current coding block; and
   reconstructing the current image frame including the first chroma sample of the current coding block.

2. The method of claim 1, wherein the reference area includes a top reference region located immediately above the current coding block, and downsampling the reference area further comprises:
   periodically selecting one column of samples among every N columns of samples in the top reference region, wherein N is an integer greater than 1; and
   including selected samples in the subset of reference area.

3. The method of claim 1, wherein the reference area includes a top reference region located immediately above the current coding block, and downsampling the reference area further comprises:
   selecting, in the top reference region, a first number of leftmost columns of samples and the first number of rightmost columns of samples; and
   including selected samples in the subset of reference area.

4. The method of claim 1, wherein the reference area includes a top reference region located immediately above the current coding block, and downsampling the reference area further comprises:
   selecting, in the top reference region, a set of successive columns of samples excluding a first number of leftmost columns of samples and the first number of rightmost columns of samples; and
   including selected samples in the subset of reference area.

5. The method of claim 1, wherein the reference area includes a left reference region located immediately to the left of the current coding block, and downsampling the reference area further comprises:
   periodically selecting one row of samples among every M rows of samples in the left reference region, wherein M is an integer greater than 1; and
   including selected samples in the subset of reference area.

6. The method of claim 1, wherein the reference area includes a left reference region located immediately to the left of the current coding block, and downsampling the reference area further comprises:

selecting, in the left reference region, a second number of topmost rows of samples and the second number of bottommost rows of samples; and including selected samples in the subset of reference area.

7. The method of claim 1, wherein the reference area includes a left reference region located immediately to the left of the current coding block, and downsampling the reference area further comprises:

selecting, in the left reference region, a set of successive rows of samples excluding a second number of topmost rows of samples and the second number of bottommost rows of samples; and including selected samples in the subset of reference area.

8. The method of claim 1, wherein downsampling the reference area further comprises:

organizing the samples of the reference area based on associated sample values; and identifying a first subset of largest samples and a second subset of smallest samples among the samples of the reference area; and including the first subset of largest samples and the second subset of smallest samples in the subset of reference area.

9. The method of claim 1, wherein the reference area includes an ordered sequence of reference regions, and downsampling the reference area further comprises:

determining a target number;

selecting the target number of samples in one or more reference regions based on the ordered sequence of reference regions; and including the target number of samples in the subset of reference area.

10. The method of claim 9, wherein the ordered sequence of reference regions are arranged based on respective distances from the current coding block.

11. The method of claim 9, wherein a first reference region is partially selected, and each selected sample of the first reference region is closer to, or has an equal distance from, the current coding block compared with unselected samples.

12. The method of claim 9, wherein a first reference region is partially selected, and each unselected sample of the first reference region is closer to, or has an equal distance from, the current coding block compared with selected samples.

13. The method of claim 1, wherein the reference area is downsampled based on a filter scheme, and the method further comprises:

determining one of a shape, a total pixel number, and an aspect ratio of the current coding block; and selecting the filter scheme from a plurality of predefined schemes based on the one of one of the shape, the total pixel number, and the aspect ratio.

14. The method of claim 1, wherein the reference area is downsampled based on a filter scheme, and the method further comprises:

determining a block size of the current coding block; and selecting the filter scheme from a plurality of predefined schemes based on the block size.

15. The method of claim 14, wherein selecting the filter scheme further comprises:

in accordance with a determination that the block size is greater than a threshold size, selecting a first scheme as the filter scheme, the first scheme having a first selection rate; and in accordance with a determination that the block size is not greater than a threshold size, selecting a second scheme as the filter scheme, the second scheme having a second selection rate that is lower than the first selection rate.

16. The method of claim 1, wherein downsampling the reference area further comprises:

applying a pooling operation on each of one or more reference regions of the reference area.

17. The method of claim 16, wherein:

the pooling operation includes an average pooling operation or an max pooling operation;

the pooling operation has a step size Y; and the subset of reference area includes A·Y samples selected from a top reference region or Y·B samples selected from a left reference region, wherein A is a total number of rows in the top reference region, and B is a total number of columns in the left reference region.

18. The method of claim 1, wherein the reference area includes a top reference region and a left reference region, and downsampling the reference area further comprises, independently:

downsampling the top reference region according to a first scheme; and downsampling the left reference region according to a second scheme.

19. The method of claim 1, further comprising, prior to downsampling the reference area:

applying a low-pass filter to samples of the reference area.

20. The method of claim 1, wherein the set of one or more luma samples includes a first luma sample that is collocated with the first chroma sample and one or more neighboring luma samples of the first luma sample, and the plurality of model parameters include a plurality of weighing factors, and generating the first chroma sample further comprises:

generating a plurality of hypothesis values based on the first luma sample and the one or more neighboring luma samples; and combining the plurality of hypothesis values, a nonlinear term of a subset of the first luma sample and the one or more neighboring luma samples, and an offset term based on the plurality of weighing factors to generate the first chroma sample.

21. The method of claim 20, determining the plurality of model parameters further comprising:

determining a least mean square (LMS) value based on the samples of the subset of reference area; and iteratively adjusting the plurality of weighing factors to reduce the LMS value until the LMS value satisfy a predefined criterion.

22. The method of claim 1, wherein the current coding block is encoded based on intra prediction, and a reference coding block is identified in the current image frame by a block vector with reference to the current coding block, and wherein the reference area further includes a neighboring area that is located immediately adjacent to the reference coding block of the current coding block.

23. The method of claim 1, wherein the current coding block is encoded based on inter prediction, and a reference block is identified in a distinct reference image frame based on a motion vector with reference to the current coding block, and wherein the reference area includes a neighboring area that is located immediately adjacent to the reference coding block in the reference image frame.

24. A computing system, comprising:

control circuitry; and memory storing one or more programs configured to be executed by the control circuitry, the one or more programs further comprising instructions for:

receiving video data comprising a current coding block of a current image frame;

encoding the current image frame;

transmitting the encoded current image frame via a video bitstream; and signaling, via the video bitstream, a syntax element for a cross-component prediction (CCP) mode indicating whether to reconstruct a first chroma sample of the current coding block based on a first luma sample and a set of associated neighboring luma samples;

wherein when the CCP mode is enabled, a reference area of the current coding block is downsampled and applied to determine a plurality of model parameters used in the CCP mode.

25. A non-transitory computer-readable storage medium storing one or more programs for execution by control circuitry of a computing system, the one or more programs comprising instructions for:

obtaining a source video sequence including a current image frame having a current coding block; and performing a conversion between the source video sequence and a video bitstream, wherein the video bitstream comprises:

the current image frame having the current coding block; and a syntax element for a cross-component prediction (CCP) mode indicating whether to reconstruct a first chroma sample of the current coding block based on a first luma sample and a set of associated neighboring luma samples;

wherein when the CCP mode is enabled, a reference area of the current coding block is downsampled and applied to determine a plurality of model parameters used in the CCP mode.

* * * * *